US012691600B2

(12) United States Patent
Kraft et al.

(10) Patent No.: US 12,691,600 B2
(45) Date of Patent: Jul. 28, 2026

(54) MODULAR PERSONAL CARE IMPLEMENT

(71) Applicant: The Gillette Company LLC, Boston, MA (US)

(72) Inventors: Viktor Kraft, Wiesbaden (DE); Rory Frederick Wellington McGarry, Boston, MA (US); Brian Patrick Watson, Marshfield, MA (US); Gerald Goerich, Weiterstadt (DE); Nicolas Götz, Ober-Ramstadt (DE); Sven Mueller, Kronberg im Taunus (DE)

(73) Assignee: The Gillette Company LLC, Boston, MA (US)

( * ) Notice: Subject to any disclaimer, the term of this patent is extended or adjusted under 35 U.S.C. 154(b) by 132 days.

(21) Appl. No.: 18/591,794

(22) Filed: Feb. 29, 2024

(65) Prior Publication Data

US 2025/0276461 A1 Sep. 4, 2025

(51) Int. Cl.
*B26B 21/52* (2006.01)
*A46B 15/00* (2006.01)
*B26B 21/22* (2006.01)

(52) U.S. Cl.
CPC ........ *B26B 21/521* (2013.01); *A46B 15/0079* (2013.01); *B26B 21/222* (2013.01); *A46B 2200/1066* (2013.01)

(58) Field of Classification Search
CPC . B26B 21/521; B26B 21/222; A46B 15/0079; A46B 2200/1066
See application file for complete search history.

(56) References Cited

U.S. PATENT DOCUMENTS

| | | | | |
|---|---|---|---|---|
| 913,076 | A | 2/1909 | Wallace | |
| 2,764,811 | A * | 10/1956 | Guardino | B26B 21/52 30/29.5 |
| 4,813,138 | A | 3/1989 | Chen | |
| 4,980,973 | A | 1/1991 | Lee et al. | |
| 10,414,058 | B2 * | 9/2019 | Lu | B26B 21/22 |
| 10,638,832 | B1 * | 5/2020 | Davies-Smith | A46B 9/04 |
| 10,800,057 | B1 * | 10/2020 | Blake | B26B 21/405 |
| 11,148,310 | B2 * | 10/2021 | Maimone | B26B 21/521 |

(Continued)

FOREIGN PATENT DOCUMENTS

| | | | |
|---|---|---|---|
| CN | 217089888 | U | 8/2022 |
| GB | 517780 | A | 2/1940 |
| GB | 634114 | A | 3/1950 |

OTHER PUBLICATIONS

PCT Search Report and Written Opinion for PCT/US2025/017794 dated Jun. 16, 2025, 11 pages.

(Continued)

*Primary Examiner* — Omar Flores Sanchez
(74) *Attorney, Agent, or Firm* — John M. Lipchitz

(57) ABSTRACT

A modular personal care implement including a surface treatment head having a first end with an applicator and a second end including an extension; an end interconnector; and a sleeve positioned between the surface treatment head and the end interconnector, in which the extension extends through the sleeve and is received in the end interconnector such that the surface treatment head is releasably attached to the end interconnector. Also provided are a method of providing a modular personal care implement and a kit including a modular personal care implement.

16 Claims, 12 Drawing Sheets

(56) References Cited

U.S. PATENT DOCUMENTS

| | | | | |
|---|---|---|---|---|
| 11,679,523 | B2 * | 6/2023 | Kopelas | B26B 21/222 30/51 |
| 12,376,671 | B2 * | 8/2025 | Jungnickel | A46B 5/0095 |
| 2008/0141536 | A1 | 6/2008 | Gratsias et al. | |
| 2017/0087733 | A1 | 3/2017 | Metcalf et al. | |
| 2017/0282392 | A1 * | 10/2017 | Maimone | B26B 21/52 |
| 2019/0029787 | A1 * | 1/2019 | Zhou | A46B 11/063 |
| 2019/0343270 | A1 * | 11/2019 | Davies-Smith | A46B 11/0082 |
| 2019/0358836 | A1 * | 11/2019 | Maimone | B26B 21/225 |
| 2020/0009712 | A1 | 1/2020 | Lin | |
| 2020/0037748 | A1 * | 2/2020 | Gatzemeyer | A46B 15/0006 |
| 2021/0259384 | A1 | 8/2021 | Mcgarry et al. | |
| 2021/0282525 | A1 * | 9/2021 | Kuo | B26B 21/446 |
| 2022/0143854 | A1 * | 5/2022 | Jungnickel | B29C 45/1676 |
| 2023/0233302 | A1 * | 7/2023 | Jungnickel | A61C 17/222 15/22.1 |
| 2024/0042634 | A1 * | 2/2024 | Bagourdas | B26B 21/521 |
| 2024/0083053 | A1 * | 3/2024 | Kopelas | B26B 21/225 |

OTHER PUBLICATIONS

All Office Actions; U.S. Appl. No. 18/591,741, filed Feb. 29, 2024.
Unpublished U.S. Appl. No. 18/591,741, filed Feb. 29, 2024, to Viktor Kraft et al.

* cited by examiner

MODULAR PERSONAL CARE IMPLEMENT

FIELD OF THE INVENTION

The disclosure generally relates to a modular personal care implement, and more particularly to a modular personal care implement having a surface treatment head and at least one interconnector.

BACKGROUND OF THE INVENTION

Handles for personal care devices, such as toothbrushes and razors, are typically made from multiple components. These may include weighted components to give the razor a more substantial feel in the user's hand and various gripping areas so the personal care device does not slip out of the user's hand in a wet environment. These component parts are in addition to the cartridge connection, which may be formed as an integral part of the handle or may be formed separately and attached to the remainder of the handle.

Personal care device manufacturers have developed numerous assembly methods utilizing various handle components. Numerous different methods and styles of handles may be used in order to stratify the appeal of a growing population of diverse consumers. Numerous different assembly methods and components for different handle designs can be costly and time consuming to develop. In addition, consumers typically change their handle as new designs are released to the market. Accordingly, it would be desirable to provide a personal care implement that can be customized to accommodate the preferences of different users.

SUMMARY OF THE INVENTION

In accordance with an aspect of the present disclosure, a modular personal care implement is provided that includes a surface treatment head having a first end with an applicator and a second end comprising an extension; an end interconnector; and a sleeve positioned between the surface treatment head and the end interconnector, in which the extension extends through the sleeve and is received in the end interconnector such that the surface treatment head is releasably attached to the end interconnector.

In accordance with another aspect of the present disclosure, a method of providing a modular personal care implement is provided, in which the method includes: providing one or more surface treatment heads each having a first end with an applicator and a second end including an extension; providing a sleeve; providing an end interconnector; releasably attaching one surface treatment head of the one or more surface treatment heads to the end interconnector such that (i) the sleeve is positioned between the one surface treatment head and the end interconnector, and (ii) the surface treatment head is releasably attached to the end interconnector.

In accordance with a further aspect of the present disclosure, a kit is provided that includes a first surface treatment head comprising a shaving razor cartridge, the first surface treatment head having a first end with an applicator and a second end including an extension, in which the applicator includes at least one blade; a sleeve; an end interconnector; a case including a top portion and a bottom portion; and an insert including one or more cavities configured to receive the first surface treatment head, sleeve, and end interconnector. The bottom portion of the case defines a compartment configured to removably receive the insert within the bottom portion. The sleeve is separate from the first surface treatment head and the end interconnector, and a portion of an outer surface of the extension is configured to engage a portion of an inner surface of the end interconnector to form one of a mechanical connection or a magnetic connection that releasably attaches the surface treatment head to the end interconnector.

BRIEF DESCRIPTION OF THE DRAWINGS

While the specification concludes with claims particularly pointing out and distinctly claiming the subject matter which is regarded as forming the present invention, it is believed that the invention will be better understood from the following description which is taken in conjunction with the accompanying drawings in which like designations are used to designate substantially identical elements, and in which:

DETAILED DESCRIPTION OF THE INVENTION

Figure 1:
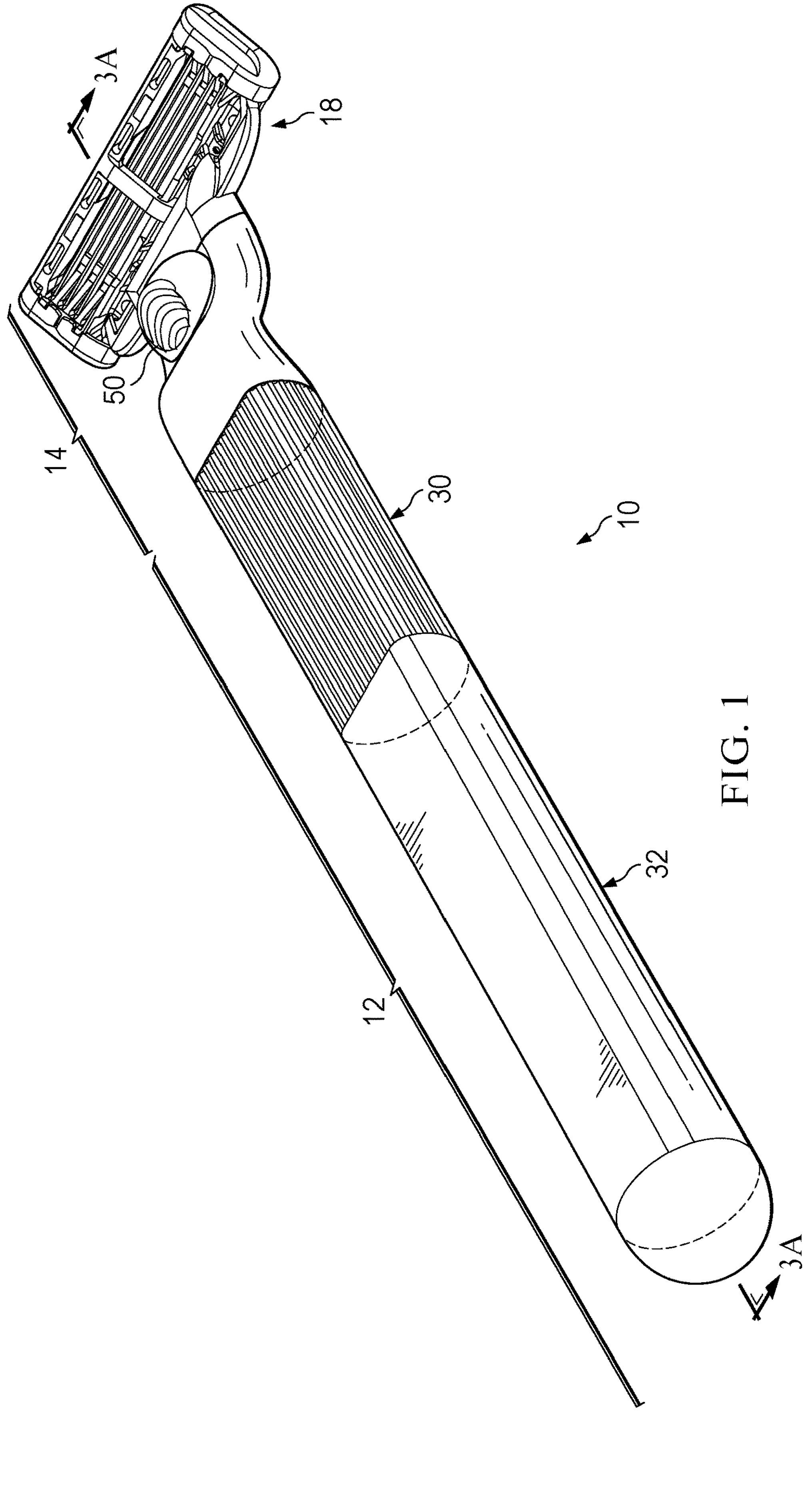
FIG. 1 is a perspective view of a modular personal care implement, in accordance with the present disclosure.
Figure 2:
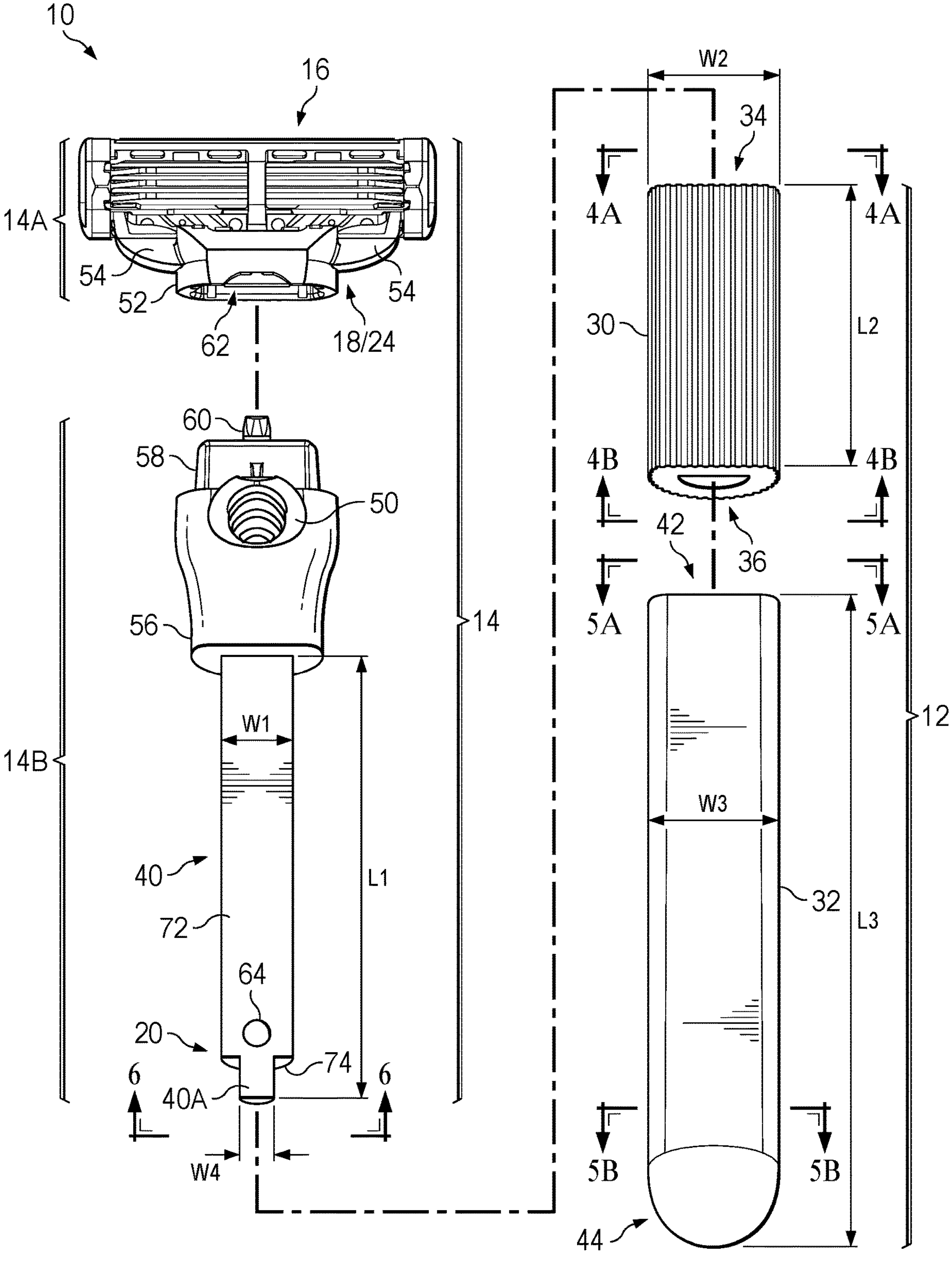
FIG. 2 is an exploded view of the modular personal care implement of FIG. 1.
Figure 3A:
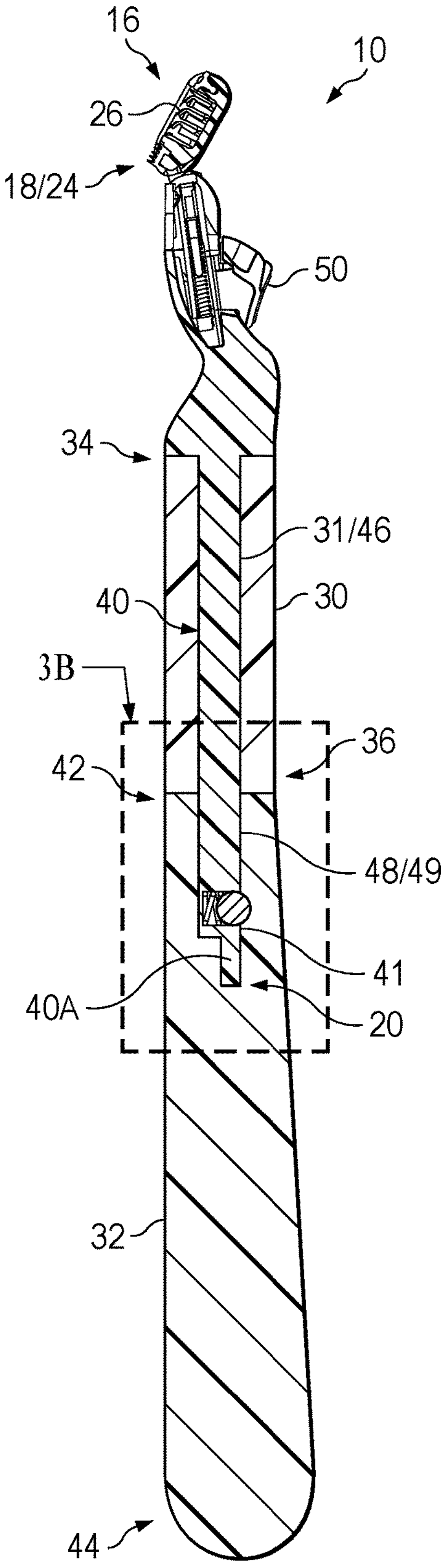
FIG. 3A is a cross-sectional view taken along line 3A-3A in FIG. 1.

With reference to FIGS. 1, 2, and 3A, a modular personal care implement 10 in accordance with the present disclosure is illustrated. The modular personal care implement 10 comprises a handle section 12 and a surface treatment head 14. The modular personal care implement 10 may be a handheld personal grooming implement, such as a shaving razor, a toothbrush, and the like. The surface treatment head 14 has a first end 16 with an applicator 18, and a second end 20 comprising an extension 40. The surface treatment head 14 may comprise a first portion 14A that includes the applicator 18, and a second portion 14B that includes the extension 40. The surface treatment head 14 may further comprise a release mechanism positioned between the first and second ends 16 and 20, i.e., between the first and second portions 14A and 14B. The release mechanism may comprise an actuator button 50 configured to eject the first portion 14A comprising the applicator 18 from the second portion 14B comprising the extension 40.

With reference to FIG. 2, the first portion 14A of the surface treatment head 14 may comprise a shaving razor cartridge 24, and the applicator 18 may comprise at least one blade 26 (see FIG. 3A). The shaving razor cartridge 24 may comprise a base 52 with two arms 54 that pivotally support a housing (not separately labeled), in which the housing includes the at least one blade 26. The second portion 14B of the surface treatment head 14 may comprise a cartridge support structure 56 with an extension 58 and a spring-biased plunger 60. The base 52 of the shaving razor cartridge 24 includes a cavity 62 that is configured to receive the extension 58 and the spring-biased plunger 60. The actuator button 50 may be moved toward the shaving razor cartridge 24, and the spring-biased plunger 60 causes the shaving razor cartridge 24 to be ejected from the cartridge support structure 56.

Although the surface treatment head 14 is depicted as a shaving razor cartridge 24 in FIGS. 1, 2, and 3A, it is understood that it may alternatively be a brush head having bristles, e.g., a toothbrush or other personal grooming or hygiene product. For example, with reference to FIG. 7, the modular personal care implement 10 may comprise a surface treatment head 14' that may comprise a first end 16' with an applicator 18' and a second end 20' with an extension 40' that may be substantially similar to the extension 40 of the surface treatment head 14 comprising the shaving razor cartridge 24. The second surface treatment head 14' may comprise a brush head 28, e.g., a toothbrush, and the applicator 18' comprises a plurality of bristles 84.

Figure 4A:
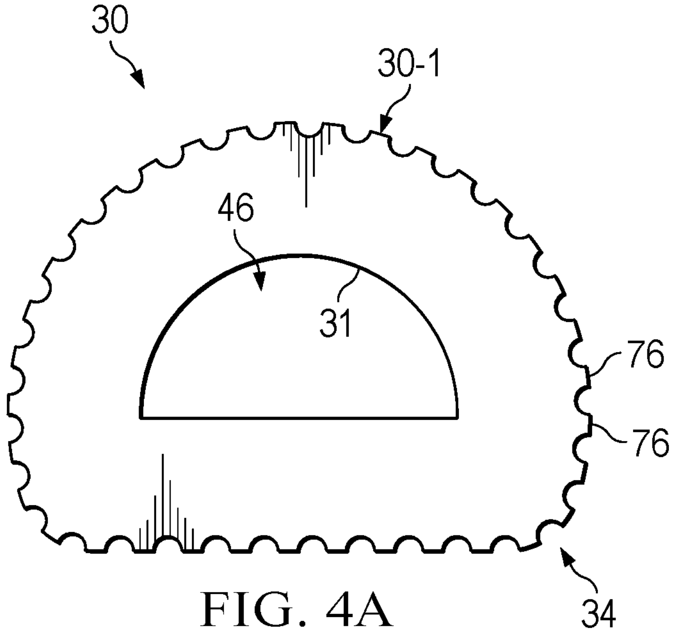
FIG. 4A is an end view taken along view line 4A-4A in FIG. 2.
Figure 4B:
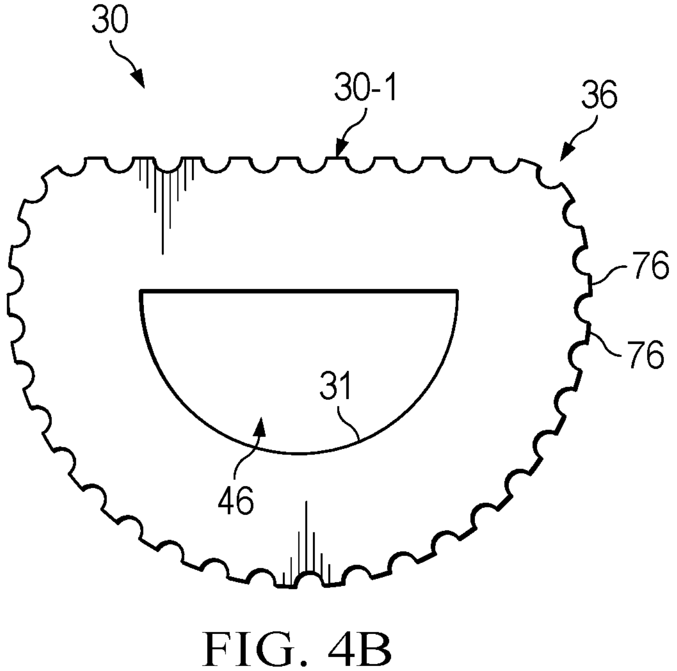
FIG. 4B is an end view taken along view line 4B-4B in FIG. 2.

As shown in FIGS. 1, 2, and 3A, the handle section 12 of the modular personal care implement 10 comprises a sleeve 30 and an end interconnector 32. The sleeve 30 has a first end 34 and a second end 36. The sleeve 30 comprises a hollow structure with an opening 46 extending from the first end 34 to the second end 36 (see also FIGS. 4A and 4B). The end interconnector 32 has a first end 42 and a second end 44, in which the second end 44 of the end interconnector 32 may define a terminus or terminal end of the handle section 12.

Figure 3B:
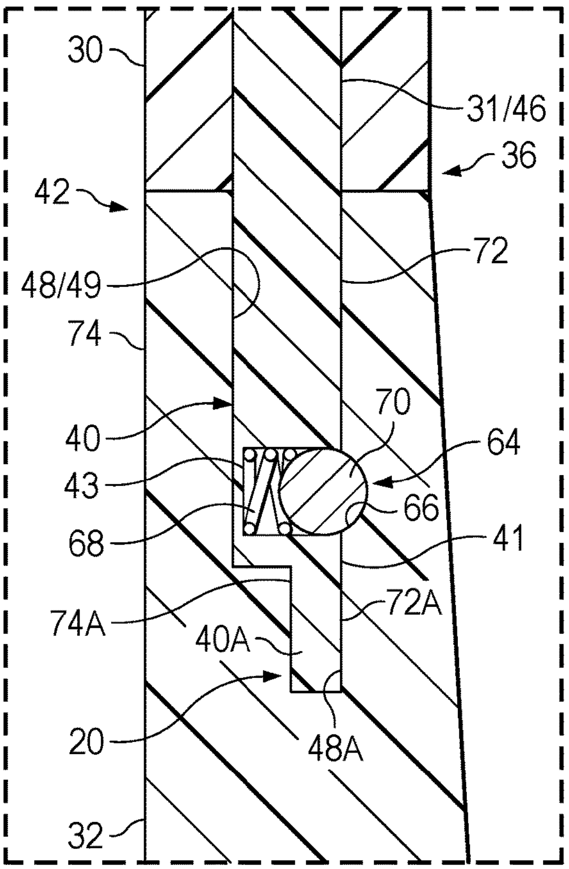
FIG. 3B is a detailed view of a portion of FIG. 3A.

To assemble the modular personal care implement 10, the sleeve 30 is placed over the extension 40, such that the extension 40 is received in and extends through the opening 46 of the sleeve 30. An inner surface 31 of the sleeve 30 comprises a shape, i.e., a substantially semicircular or hemispherical cross-sectional shape, that corresponds to an adjacent portion of an outer surface 41 of the extension 40, such that the extension 40 fits snugly within the sleeve 30, as shown in FIGS. 3A and 3B. As described herein, the extension 40 is then inserted into and received in the end interconnector 32, such that the surface treatment head 14 is releasably attached to the end interconnector 32. Upon assembly, the sleeve 30 is positioned between the surface treatment head 14 and the end interconnector 32. As used herein, the term "releasably attach" and similar terms are intended to refer to a connection or coupling that is configured to be formed repeatedly by a consumer attaching and detaching components under normal use conditions without causing damage to the components.

Figure 5A:
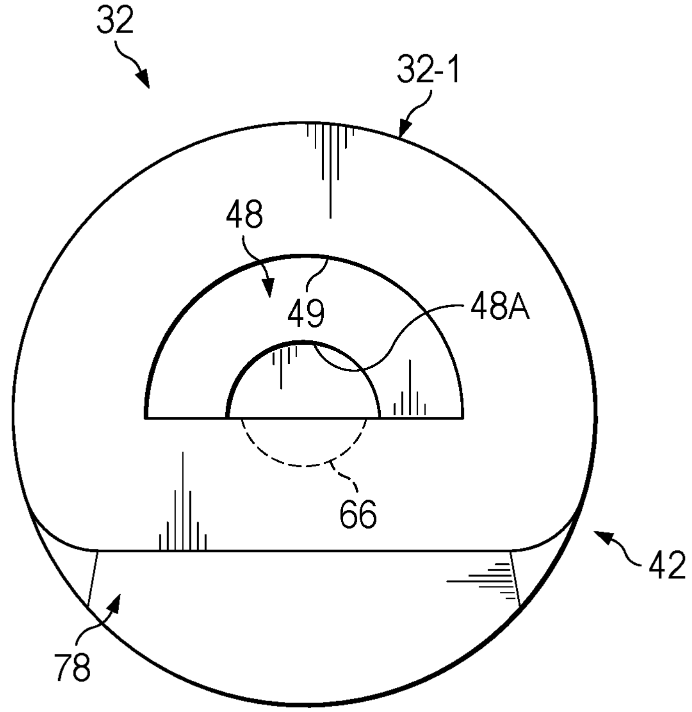
FIG. 5A is an end view taken along view line 5A-5A in FIG. 2.
Figure 5B:
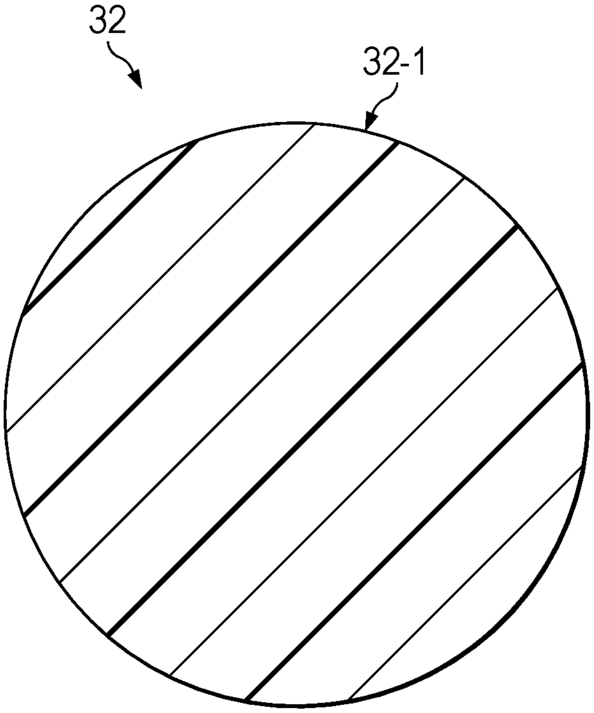
FIG. 5B is a cross-sectional view taken along line 5B-5B in FIG. 2.

As shown in FIGS. 3A, 3B, and 5A, the end interconnector 32 comprises a bore 48 extending longitudinally inward from the first end 42 toward the second end 44. The bore 48 comprises an inner surface 49 with a shape, i.e., a substantially semicircular or hemispherical cross-sectional shape, that corresponds to an adjacent portion of the outer surface 41 of the extension 40, such that the extension 40 fits snugly within the bore 48, as shown in FIGS. 3A and 3B. As described herein, a portion of the outer surface 41 of the extension 40 engages a portion of an inner surface of the end interconnector 32, i.e., a portion of the inner surface 49 of the bore 48, to form one of a mechanical connection or a magnetic connection that releasably attaches the surface treatment head 14 to the end interconnector 32. Upon assembly, the sleeve 30 is held in position between the surface treatment head 14 and the end interconnector 32 by engagement between the portion of the outer surface 41 of the extension 40 and the portion of the inner surface of the end interconnector 32, i.e., the portion of the inner surface 49 of the bore 48.

Figure 6:
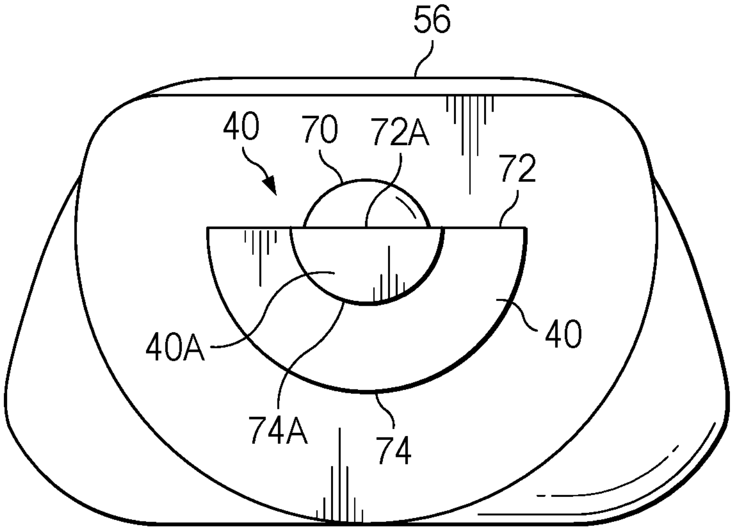
FIG. 6 is an end view taken along view line 6-6 in FIG. 2.

In the example shown in FIGS. 2, 3A, and 3B, a connection between the extension 40 and the end interconnector 32 may comprise a mechanical connection in the form of a ball-snap mechanism. The portion of the outer surface 41 of the extension 40 that engages the portion of the inner surface of the end interconnector 32 may comprise a spring-loaded ball mechanism 64. As shown in FIGS. 2, 3B, and 6, the outer surface 41 of the extension 40 may comprise a planar surface 72 and a curved surface 74 opposite the planar surface 72, in which the planar and curved surfaces 72 and 74 define a substantially semicircular or hemispherical cross-sectional shape that corresponds to the shape of the inner surface 31 of the sleeve 30 and the inner surface 49 of the bore 48. The planar surface 72 comprises a cavity 43 extending inward toward the curved surface 74, and the spring-loaded ball mechanism 64 may be inserted into and fixed to the cavity 43, e.g., by a press-fitting process and/or gluing. The spring-loaded ball mechanism 64 may comprise a spring 68 and a spring-loaded ball 70, in which the spring 68 may apply a force onto the ball 70 that biases the ball 70 outward, such that the ball 70 extends slightly above the outer surface 41 of the extension 40 as shown in FIG. 6. The ball 70 and/or the spring 68 may comprise one or more materials, including a plastic and/or a metal, such as stainless steel.

As shown in FIGS. 3B and 6, the portion of the inner surface of the end interconnector 32, i.e., a portion of the inner surface 49 of the bore 48, comprises a recess 66 that is configured to receive the ball 70. When the modular personal care implement 10 is assembled, the extension 40 may be fed linearly through the sleeve 30 and into the bore 48 formed in the end interconnector 32. The spring 68 allows the ball 70 to drop down into the cavity 43 so that the ball 70 is flush with the outer surface 41 of the extension 40 as the extension 40 passes through the sleeve 30 and into the bore 48. When the extension 40 is received in the end interconnector 32, the spring 68 biases the ball 70 outward so that the ball 70 engages the recess 66, as best seen in FIGS. 3A and 3B. Engagement between the ball 70 and the recess 66 provides a snap-fit locking mechanism to ensure sufficiently strong connection and stability between the surface treatment head 14 and the end interconnector 32, e.g. to enable a user to perform a shaving or brushing action. Once the extension 40 is snap-fitted into the end interconnector 32, the surface treatment head 14 is fixed in an axial direction so that the surface treatment head 14 does not loosen, twist, or rotate during use. The snap-fit may provide a precise fixation of the surface treatment head 14, and a distinct haptic feedback may be given to the user that the surface treatment head 14 is snapped-on securely, i.e., the user may recognize once the ball 70 engages into the recess 66. The surface treatment head 14 may be fixed to the end interconnector 32 until a specific/predetermined pull-off force is applied. The surface treatment head 14 may be easily removed by applying a linear motion to pull the surface treatment head 14 apart from the end interconnector 32. When the predetermined pull-off force is exceeded, the ball 70 is forced back into the cavity 43, and the extension 40 may be removed from the end interconnector 32 and the sleeve 30.

With reference to FIGS. 2, 3A, 3B, and 6, the extension 40 may comprise a tab 40A extending outward therefrom. The tab 40A may mirror a shape of the extension 40 and may comprise a planar surface 72A and a curved surface 74A opposite the planar surface 72A. A width $W_4$ of the tab 40A may be less than a width $W_1$ of the extension 40, in which the planar surface 72 of the extension 40 and the planar surface 72A of the tab 40A extend within a same plane (not shown) and the curved surface 74A of the tab 40A is recessed with respect to the curved surface 74 of the extension 40. The end interconnector 32 may comprise a further bore 48A extending longitudinally inward from the bore 48 toward the second end 44. When the extension 40 is received in the end interconnector 32, the tab 40A is received in the further bore 48A, which may serve as, for example, a location feature to ensure that the surface treatment head 14 is properly aligned with the end interconnector 32.

As shown in FIGS. 4A, 4B, 5A, and 5B, an outer surface 30-1 of the sleeve 30 may comprise a plurality of gripping protrusions 76, and an outer surface 32-1 of the end interconnector 32 may be smooth. The gripping protrusions 76 of the sleeve 30 may assist with gripping the modular personal care implement 10 in a wet environment.

The sleeve 30 may comprise a first cross-sectional shape, and at least a portion of the end interconnector 32 may comprise a second cross-sectional shape that is different from the first cross-sectional shape. For example, as shown in FIGS. 1, 3A, 4A, and 4B, the outer surface 30-1 of the sleeve 30 (excluding the gripping protrusions 76) defines a substantially semicircular or hemispherical cross-sectional shape with a flat portion and a curved portion, in which the shape of the sleeve 30 may be uniform along an entirety of a length (not labeled) of the sleeve 30. As shown in FIGS. 1, 3A, 5A, and 5B, the outer surface 32-1 of the end interconnector 32 near the first end 42 defines a substantially semicircular or hemispherical cross-sectional shape that corresponds to the cross-sectional shape of the sleeve 30 shown in FIGS. 1, 4A, and 4B. The semicircular/hemispherical cross-sectional shape of the sleeve 30 and the first end 42 of the end interconnector 32 may provide an ergonomic shape that may assist with gripping the modular personal care implement 10. The end interconnector 32 may include a transition section 78 located between the first and second ends 42 and 44, in which the cross-sectional shape of the end interconnector 32 transitions from the substantially semicircular/hemispherical cross-sectional shape near the first end 42 to a substantially circular cross-sectional shape near the second end 44.

The surface treatment head 14, the sleeve 30, and the end interconnector 32 may comprise one or more materials and may have one or more different properties such as hardness, coefficient of friction, surface texture, mass, color, length, and/or width. The sleeve 30 may comprise one or more first materials, and the end interconnector 32 may comprise one or more second materials that are the same as or different from the first material(s). For example, the sleeve 30 and the end interconnector 32 may comprise one or more elastomers, silicones, engineering plastics, or metals. In some examples, the end interconnector 32 may comprise a relatively heavy material such as a metal or metal alloy and/or the end interconnector 32 may optionally comprise an insert (not shown) to increase an overall mass of the modular personal care implement 10. In some examples, the overall mass of the modular personal care implement 10 may be about 15 g. The surface treatment head 14, including the extension 40, may comprise the same or different material (s).

The sleeve 30 may comprise a material with a first hardness, and the end interconnector 32 may comprise a material with a second hardness that is the same as or different from the first hardness. In some examples, the sleeve 30 and/or end interconnector 32 may comprise a softer material with a shore A hardness of about 20 to 40. In other examples, the sleeve 30 and/or end interconnector 32 may comprise a harder material with a shore A hardness greater than 50, e.g., from about shore A 60 to about shore D 100. Materials comprising metal may have a shore D hardness of greater than 100. The material(s) comprising the surface treatment head 14 may have the same hardness or a different hardness. Softer materials may provide a more comfortable and improved gripping surface, while harder materials may provide greater durability and resistance to damage.

The sleeve 30 may comprise a material with a first coefficient of friction (CoF), and the end interconnector 32 may comprise a material with a second CoF that is the same as or different from the first CoF. The material(s) comprising the surface treatment head 14 may have the same CoF or a different CoF. Materials with a higher CoF may provide a better gripping surface, e.g., within the handle section 12, while materials with a lower CoF provide higher glide or slipperiness.

The sleeve 30 may comprise a first surface texture, and the end interconnector 32 may comprise a second surface texture that is the same as or different from the first surface texture. The surface treatment head 14 may have the same surface texture or a different surface texture. The surface texture may be determined, at least in part, by the material(s) and/or the presence or absence of gripping protrusions 76 and/or other structures that form one or more protrusions or peaks and/or recesses or valleys on a surface of the component.

The sleeve 30 may comprise one or more first colors, and the end interconnector 32 may comprise one or more second colors that are the same as or different from the first color(s). The surface treatment head 14 may have the same color(s) or one or more different colors. For example, the surface treatment head 14, the sleeve 30, and/or the end interconnector 32 may be selected to include a color combination corresponding to a country flag, a favorite sports team, etc.

The second portion 14B of the surface treatment head 14 (specifically the extension 40), the sleeve 30, and the end interconnector 32 may each comprise a respective length $L_1$, $L_2$, and $L_3$ and a respective width $W_1$, $W_2$, and $W_3$. The length(s) $L_1$, $L_2$, and $L_3$ and/or widths $W_1$, $W_2$, and $W_3$ of the components may be varied as desired to obtain a desired configuration of the handle section 12. In some examples, the overall length of the handle section 12 may be 120 mm to 150 mm. In other examples, the overall length of the handle section 12 may be 600 mm or greater, e.g., for hard-to-reach areas such as the user's back.

Figure 7:
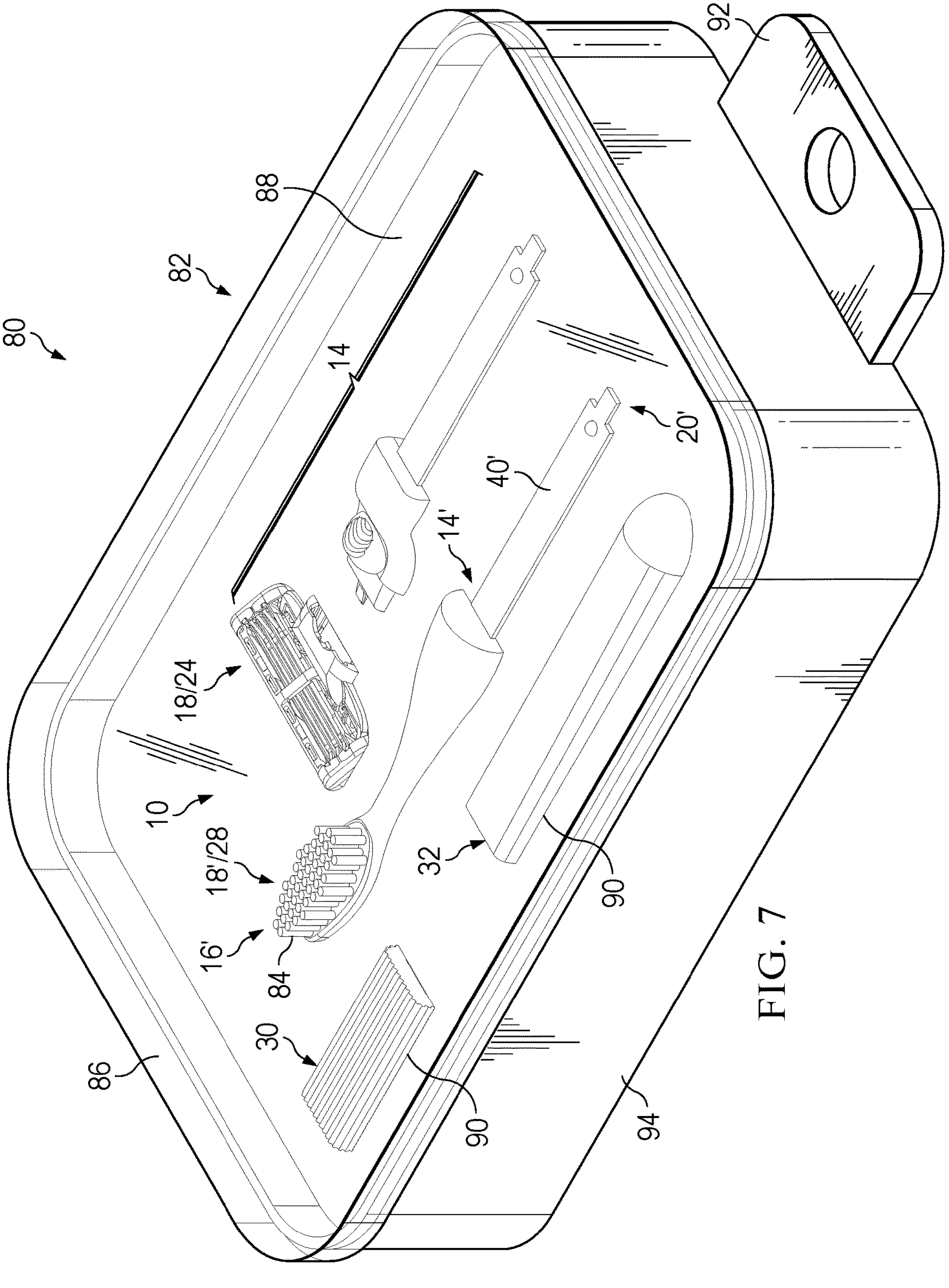
FIG. 7 is a perspective view of a kit comprising a modular personal care implement, in accordance with the present disclosure.

As shown in FIG. 7, the modular personal care implement 10 in accordance with the present disclosure may be part of a kit 80 comprising multiple components, including one or more surface treatment heads 14 and 14', a sleeve 30, and an end interconnector 32. In the example shown in FIG. 7, the kit 80 includes a first surface treatment head 14 comprising a shaving razor cartridge 24, a second surface treatment head 14' comprising a brush head 28, and an end interconnector 32. It may be understood that the kit 80 may include any number or configuration of the components described herein, e.g., one or more additional sleeves 30 and/or end interconnectors 32. In some examples, the kit 80 may include two or more components having a different length and/or width (see FIG. 3A) so that an overall length and/or width (not labeled) of the handle section 12 may be customized as desired. For example, the kit 80 may include two surface treatment heads having extensions with different lengths and/or widths (not shown); two sleeves with different lengths and/or widths (not shown); and/or two end interconnectors having extensions with different lengths and/or widths (not shown).

The kit 80 may include a case 82 comprising a top portion 86 and a bottom portion 94 that is configured to removably receive an insert 88 within the bottom portion 94. The insert 88 may comprise one or more cavities 90 configured, i.e., sized and shaped, to receive the components of the kit 80, e.g., the surface treatment head(s) 14 and/or 14', the sleeve 30, and the end interconnector 32. The bottom portion 94 may be configured to be received in the top portion 86 to enclose the kit 80 and the components thereof. The top and bottom portions 86 and 94 may be coupled together by a friction fit, a hinge (not shown), and/or by other means, such as one or more adhesive stickers or labels. The top and bottom portions 86 and 94 of the case 82 may comprise a durable material such as an engineering plastic (e.g., a polycarbonate), a metal, or a metal alloy (e.g., steel, aluminum, tin, or combinations thereof). The case 82 may provide a sturdy, multi-use container that protects the components of the kit 80. The case 82 may also serve as a durable and convenient storage and travel kit and may be used to hold, organize, and store the components of the modular personal care implement 10 for day-to-day use. The case 82 may comprise a hang tag 92 that may be coupled to the case 82 via adhesive or other suitable attachment means or may be formed as part of the case 82. The hang tag 92 may be removable. The hang tag 92 may be configured to allow the kit 80 to be displayed and/or stored and may comprise an aperture (not labeled) that allows the kit 80 to be associated with a display and/or storage system (not shown) by, for example, hanging the kit 80 from a hook or peg.

The modular personal care implement 10 in accordance with the present disclosure provides an ergonomic handle section 12 with separable components that allow a user to customize the configuration as desired and to easily replace the components or a portion thereof. With reference to FIGS. 1, 2, and 3A, the surface treatment head 14 comprising the shaving razor cartridge 24 may be replaced in its entirety by detaching the extension 40 from the end interconnector 32 and releasably attaching a new surface treatment head 14. Alternatively, only the shaving razor cartridge 24 may be replaced by actuating the actuator button 50 to eject the shaving razor cartridge 24 from the cartridge support structure 56 and attaching a new shaving razor cartridge 24 to the cartridge support structure 56. The surface treatment head 14' comprising a brush head 28 (see FIG. 7) may be replaced by detaching the extension 40' from the end interconnector 32 and releasably attaching a new surface treatment head 14'. The sleeve 30 and/or the end interconnector 32 may also be detached and replaced. The user may select a combination of the surface treatment head 14, 14', the sleeve 30, and/or the end interconnector 32 having desired lengths and/or widths to customize the overall length and/or width of the handle section 12 as desired.

Figure 8:
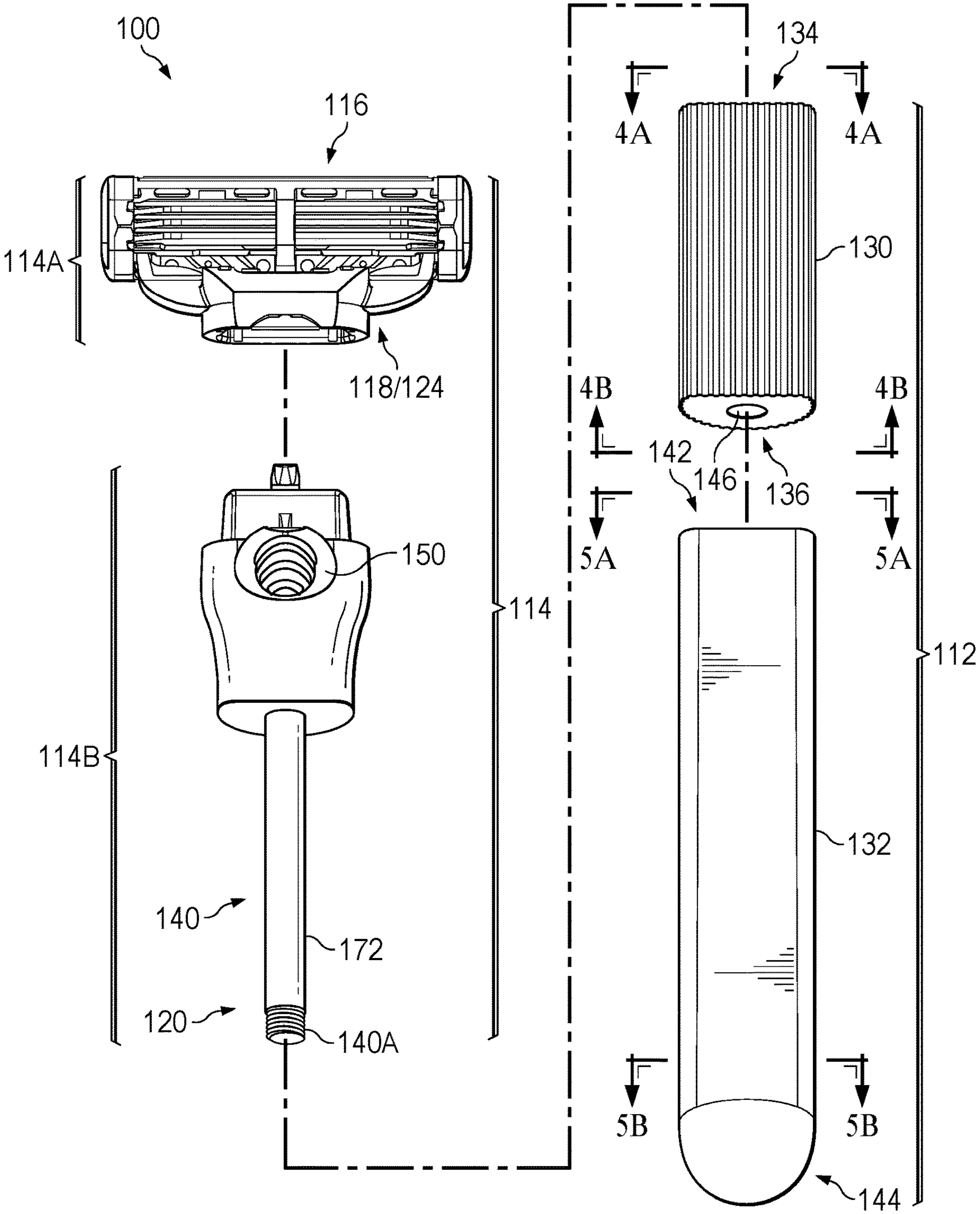
FIG. 8 is an exploded view of a modular personal care implement, in accordance with the present disclosure.
Figure 9A:
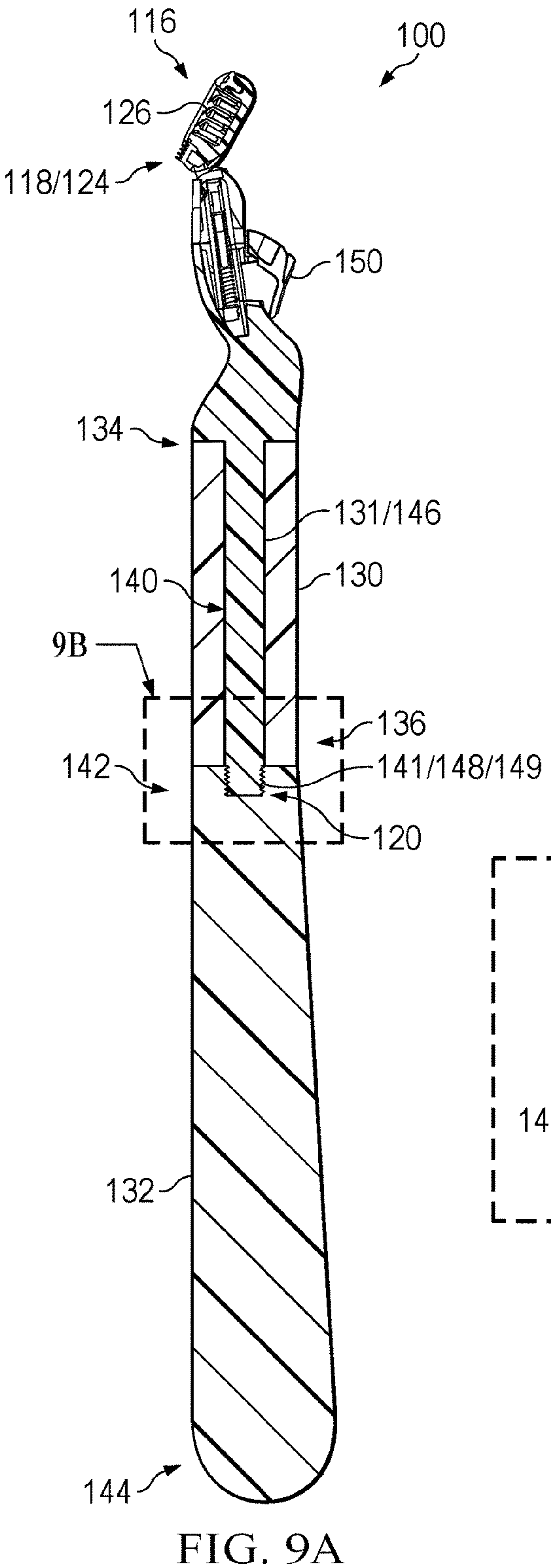
FIG. 9A is a cross-sectional view similar to FIG. 3A of the modular personal care implement of FIG. 8.
Figure 9B:
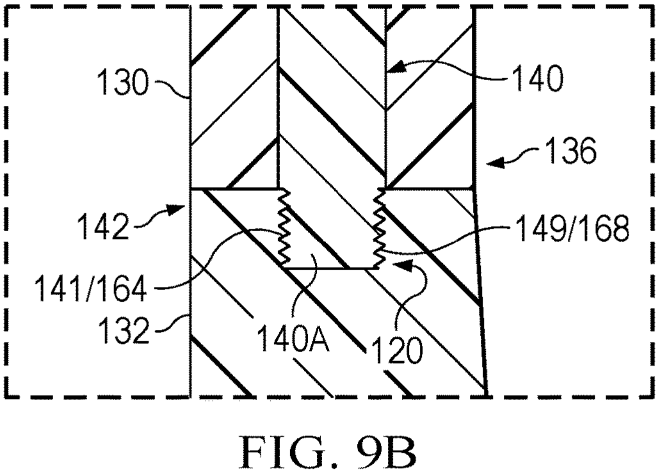
FIG. 9B is a detailed view of a portion of FIG. 9A.

FIGS. 8, 9A, and 9B illustrate another example of a modular personal care implement 100 in accordance with the present disclosure. The modular personal care implement 100 comprises a handle section 112 and a surface treatment head 114. The surface treatment head 114 has a first end 116 with an applicator 118, and a second end 120 with an extension 140. Apart from the extension 140, the surface treatment head 114 may be substantially similar to the surface treatment head 14 described with respect to FIGS. 1, 2, 3A, and 3B and may comprise a first portion 114A that includes the applicator 118 and a second portion 114B that includes the extension 140. As described with respect to the modular personal care implement 10, the surface treatment head 114 may further comprise a release mechanism, e.g., an actuator button 150, that is configured to eject the first portion 114A comprising the applicator 118 from the second portion 114B comprising the extension 140. In the example shown in FIG. 8, the surface treatment head 114 comprises a shaving razor cartridge 124, and the applicator 118 comprises at least one blade 126. It may be understood that the surface treatment head 114 may comprise a brush head, as described with respect to FIG. 7.

The handle section 112 of the modular personal care implement 100 comprises a sleeve 130 and an end interconnector 132. The sleeve 130 has a first end 134 and a second end 136 and comprises a hollow structure with an opening 146 extending from the first end 134 to the second end 136. The sleeve 130 may be substantially similar to the sleeve 30 described herein except that the opening 146 is circular instead of semicircular or hemispherical. Apart from a connection between the extension 140 and the end interconnector 132, the end interconnector 132 may be substantially similar to the end interconnector 32 described herein. The end interconnector 132 has a first end 142 and a second end 144, in which the second end 144 of the end interconnector 132 may define a terminus or terminal end of the handle section 112.

As shown in FIGS. 9A and 9B, the end interconnector 132 comprises a bore 148 extending longitudinally inward from the first end 142 toward the second end 144. A portion of an outer surface 141 of the extension 140 engages a portion of an inner surface of the end interconnector 132, i.e., a portion of an inner surface 149 of the bore 148, to form a mechanical connection that releasably attaches the surface treatment head 114 to the end interconnector 132. The extension 140 may comprise a circular cross-section, such that the extension 140 fits within the sleeve 130. Similar to the modular personal care implement 10, upon assembly of the modular personal care implement 100, the sleeve 130 is held in position between the surface treatment head 114 and the end interconnector 132 by engagement between the portion of the outer surface 141 of the extension 140 and the portion of the inner surface of the end interconnector 132, i.e., the portion of the inner surface 149 of the bore 148.

In the example shown in FIGS. 8, 9A, and 9B, the connection between the extension 140 and the end interconnector 132 may comprise a mechanical connection in the form of a threaded connection. The portion of the outer surface 141 of the extension 140 that engages the portion of the inner surface of the end interconnector 132 may comprise a tab 140A extending outward therefrom, in which the tab 140A comprises external threads 164. The tab 140A may comprise a circular cross-section. The portion of the inner surface 149 of the bore 148 also comprises a circular cross-section and includes corresponding internal threads

168 that receive the external threads 164 to securely and releasably attach the surface treatment head 114 to the end interconnector 132. The modular personal care implement 100 may be disassembled by unscrewing the surface treatment head 114 from the end interconnector 132. In the example shown in FIGS. 9A and 9B, only the tab 140A is received in the bore 148. In other examples (not shown), the bore 148 may also receive a portion of the extension 140, similar to the example shown in FIGS. 3A and 3B.

The modular personal care implement 100 may be part of a kit (not shown) comprising multiple components, including one or more surface treatment heads 114, one or more sleeves 130, and at least one end interconnector 132. The kit comprising the modular personal care implement 100 may be substantially similar to the kit 80 described with respect to FIG. 7. As described with respect to the modular personal care implement 10, the modular personal care implement 100 provides an ergonomic handle section 112 that allows a user to customize the configuration as desired, e.g., to obtain a desired length and/or width (not labeled) of the handle section 112 and/or to adjust the hardness, coefficient of friction, surface texture, mass, and/or color to obtain a desired look and feel for the handle section 112. The surface treatment head 114 may also be easily replaced, as described herein.

Figure 10:
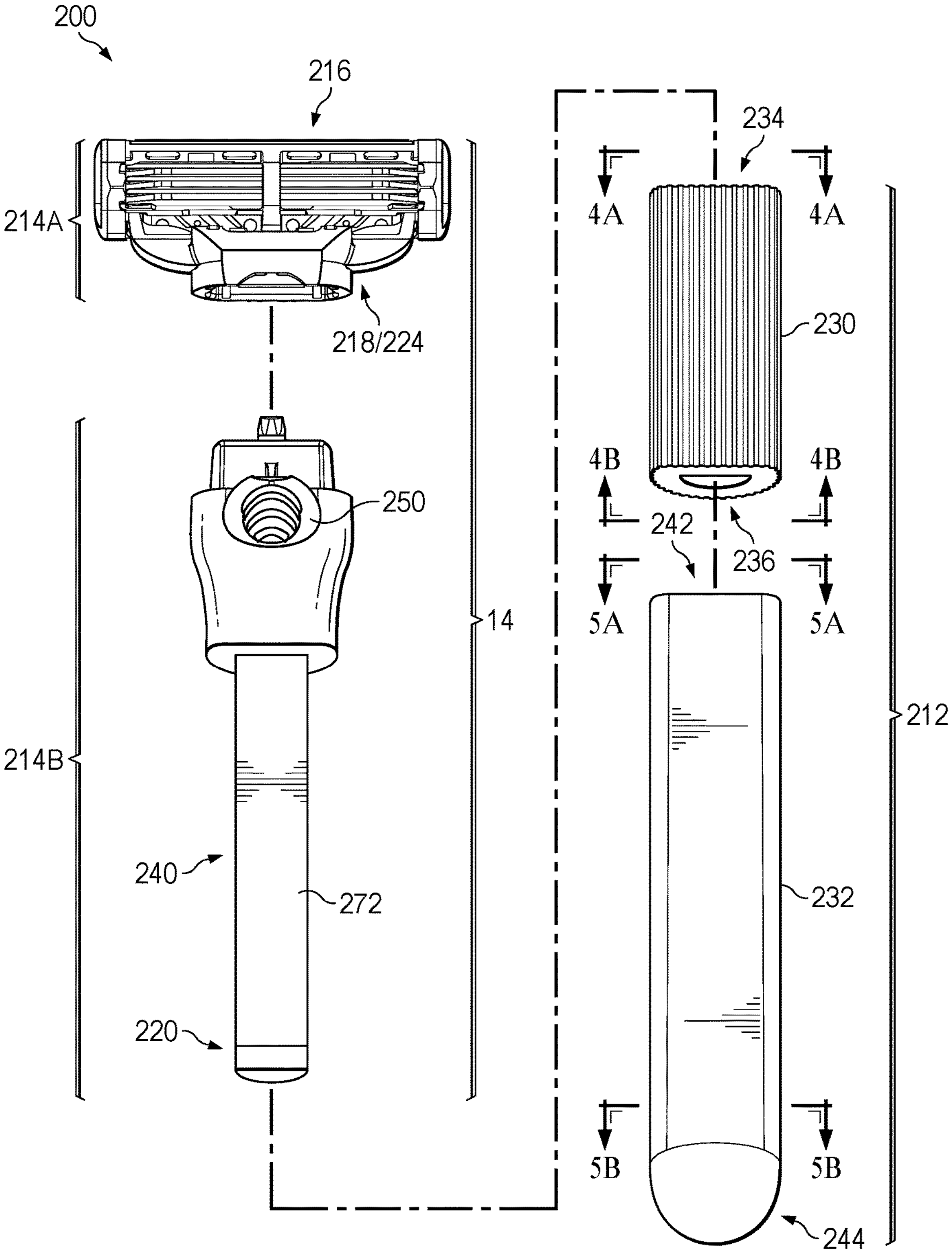
FIG. 10 is an exploded view of a modular personal care implement, in accordance with the present disclosure.
Figure 11A:
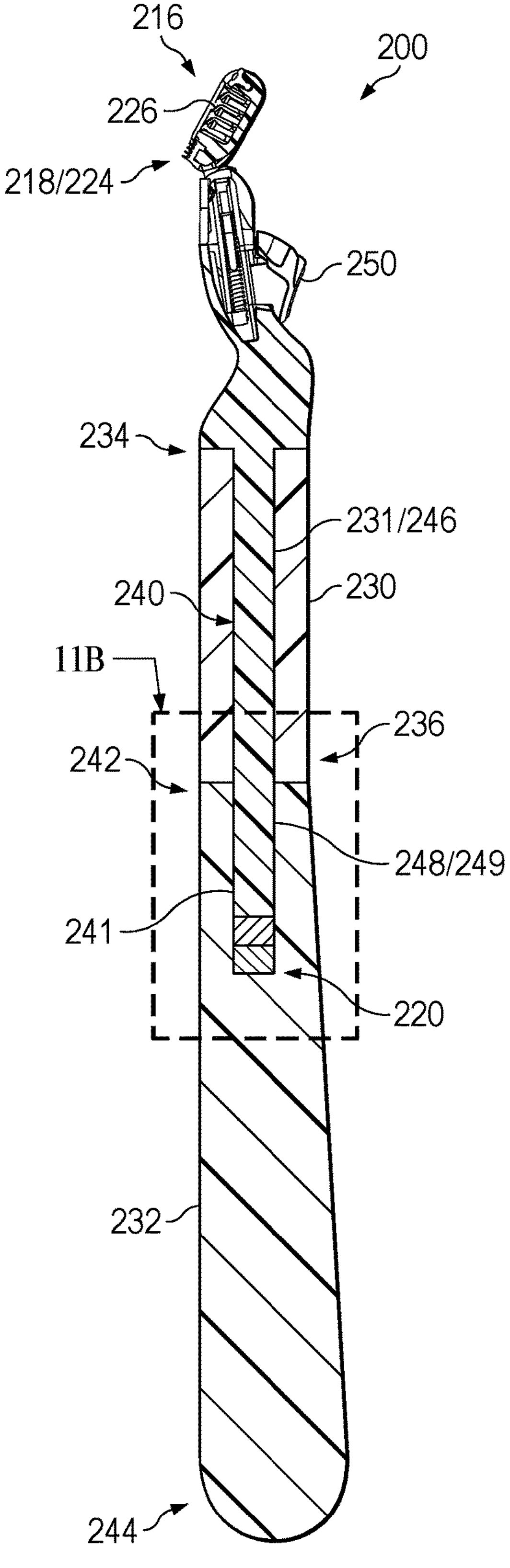
FIG. 11A is a cross-sectional view similar to FIG. 3A of the modular personal care implement of FIG. 10.
Figure 11B:
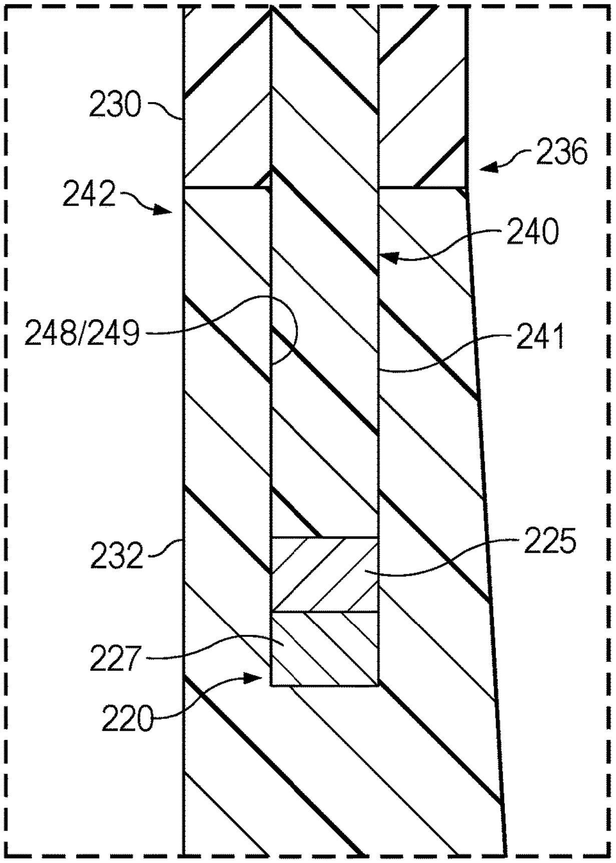
FIG. 11B is a detailed view of a portion of FIG. 11A.

FIGS. 10, 11A, and 11B illustrate another example of a modular personal care implement 200 in accordance with the present disclosure. The modular personal care implement 200 comprises a handle section 212 and a surface treatment head 214. The surface treatment head 214 has a first end 216 with an applicator 218, and a second end 220 with an extension 240. Apart from the extension 240, the surface treatment head 214 may be substantially similar to the surface treatment head 14 described herein and may comprise a first portion 214A that includes the applicator 218 and a second portion 214B that includes the extension 240. As described with respect to the modular personal care implement 10, the surface treatment head 214 may further comprise a release mechanism, e.g., an actuator button 250, that is configured to eject the first portion 214A comprising the applicator 218 from the second portion 214B comprising the extension 240. In the example shown in FIG. 10, the surface treatment head 214 comprises a shaving razor cartridge 224, and the applicator 218 comprises at least one blade 226. It may be understood that the surface treatment head 214 may comprise a brush head, as described with respect to FIG. 7.

The handle section 212 of the modular personal care implement 200 comprises a sleeve 230 and an end interconnector 232. The sleeve 230 has a first end 234 and a second end 236 and comprises a hollow structure with an opening (not labeled) extending from the first end 234 to the second end 236. The sleeve 230 may be identical or substantially similar to the sleeve 30 described herein, and an inner surface (not labeled) of the sleeve 230 comprises a shape, i.e., a substantially semicircular or hemispherical cross-sectional shape, that corresponds to an adjacent portion of an outer surface 241 of the extension 240, such that the extension 240 fits snugly within the sleeve 230. Apart from a connection between the extension 240 and the end interconnector 232, the end interconnector 232 may be substantially similar to the end interconnector 32 described herein. The end interconnector 232 has a first end 242 and a second end 244, in which the second end 244 of the end interconnector 232 may define a terminus or terminal end of the handle section 212.

As shown in FIGS. 11A and 11B, the end interconnector 232 comprises a bore 248 extending longitudinally inward from the first end 242 toward the second end 244. The bore 248 comprises an inner surface 249 with a shape, i.e., a substantially semicircular or hemispherical cross-sectional shape, that corresponds to an adjacent portion of the outer surface 241 of the extension 240, such that the extension 240 fits snugly within the bore 248. A portion of the outer surface 241 of the extension 240 engages a portion of an inner surface of the end interconnector 232, i.e., a portion of an inner surface 249 of the bore 248, to form a connection that releasably attaches the surface treatment head 214 to the end interconnector 232. Similar to the modular personal care implement 10, upon assembly of the modular personal care implement 200, the sleeve 230 is held in position between the surface treatment head 214 and the end interconnector 232 by engagement between the portion of the outer surface 241 of the extension 240 and the portion of the inner surface of the end interconnector 232, i.e., the portion of the inner surface 249 of the bore 248.

In the example shown in FIGS. 10, 11A, and 11B, the connection between the extension 240 and the end interconnector 232 may comprise a magnetic connection. The portion of the outer surface 241 of the extension 240 comprises a magnetic material, e.g., a magnet 225, and the portion of the inner surface of the end interconnector 232 comprises a magnetic material, e.g., a magnet 227. The magnetic materials each produce a magnetic field, in which the magnetic material of the extension 240 is attracted to the magnetic material of the end interconnector 232 to create the magnetic connection and securely and releasably attach the surface treatment head 214 to the end interconnector 232. The substantially semicircular or hemispherical cross-sectional shape of the extension 240 and the bore 248 may help to prevent rotation of the surface treatment head 214 and align the surface treatment head 214 with respect to the end interconnector 132. The modular personal care implement 200 may be disassembled by pulling the surface treatment head 214 away from the end interconnector 232 with a force sufficient to break the magnetic connection.

The modular personal care implement 200 may be part of a kit (not shown) comprising multiple components, including one or more surface treatment heads 214, one or more sleeves 230, and at least one end interconnector 232. The kit comprising the modular personal care implement 200 may be substantially similar to the kit 80 described with respect to FIG. 7. As described with respect to the modular personal care implement 10, the modular personal care implement 200 provides an ergonomic handle section 212 that allows a user to customize the configuration as desired, e.g., to obtain a desired length and/or width (not labeled) of the handle section 212 and/or to adjust the hardness, coefficient of friction, surface texture, mass, and/or color to obtain a desired look and feel for the handle section 212. The surface treatment head 214 may also be easily replaced, as described herein.

Figure 12:
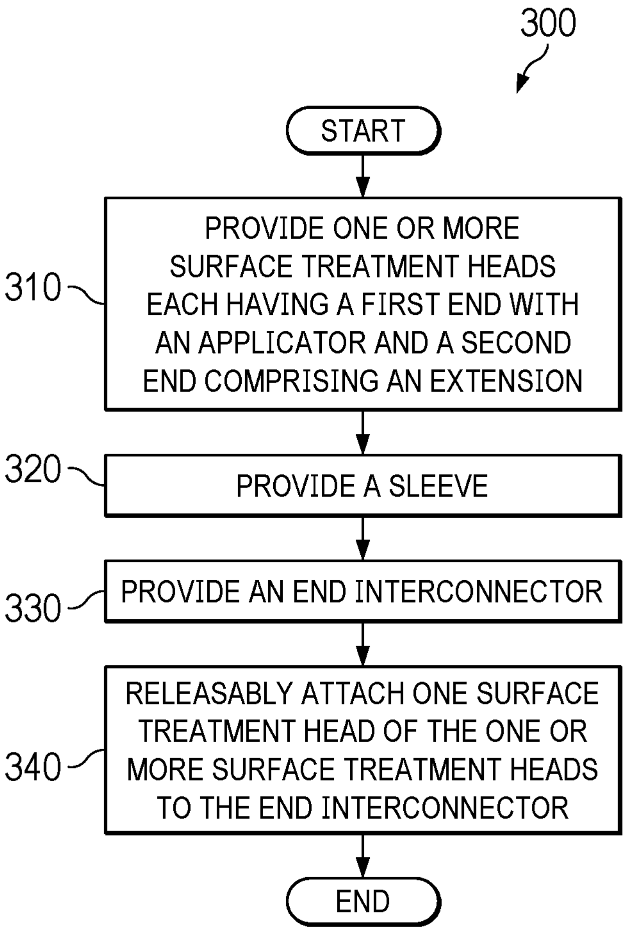
FIG. 12 is a flow diagram of a method of providing a modular personal care implement, in accordance with the present disclosure.

FIG. 12 is a flow diagram of a method 300 of providing a modular personal care implement, in accordance with the present disclosure. As shown in FIG. 12, the method 300 includes providing one or more surface treatment heads each having a first end with an applicator and a second end comprising an extension at 310; providing a sleeve at 320; providing an end interconnector at 330; and at 340, releasably attaching one surface treatment head of the one or more surface treatment heads to the end interconnector such that (i) the sleeve is positioned between the one surface treatment head and the end interconnector, and (ii) the surface treatment head is releasably attached to the end interconnector, after which the method 300 may conclude.

The one surface treatment head may comprise a first applicator, and the method may further comprise: removing the one surface treatment head from the end interconnector; selecting a second surface treatment head comprising a second applicator; and releasably attaching the second surface treatment head to the end interconnector such that (i) the sleeve is positioned between the second surface treatment head and the end interconnector, and (ii) the second surface treatment head is releasably attached to the end interconnector.

The modular personal care implement formed by the method 300 may include any of the modular personal care implements 10, 100, and 200 described herein. Releasably attaching the one surface treatment head of the one or more surface treatment heads to the end interconnector may comprise engaging a portion of an outer surface of the extension with a portion of an inner surface of the end interconnector to form one of a mechanical connection or a magnetic connection, in which the sleeve is held in position between the one surface treatment head and the end interconnector by engagement between the portion of the outer surface of the extension and the portion of the inner surface of the end interconnector. In some examples, the mechanical connection may comprise a ball-snap connection, in which the portion of the outer surface of the extension may comprise a spring-loaded ball, the portion of the inner surface of the end interconnector comprises a recess, and the extension extends through the sleeve and is received in the end interconnector such that the spring-loaded ball engages the recess.

The one or more surface treatment heads may each further comprise a release mechanism positioned between the first and second end of the surface treatment head, and the method may further comprise actuating the release mechanism to eject a portion of the one surface treatment head comprising the applicator.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A modular personal care implement comprising:
- a surface treatment head having a first end with an applicator and a second end comprising an extension;
- an end interconnector; and
- a sleeve positioned between the surface treatment head and the end interconnector,
- wherein the extension extends through the sleeve and is received in the end interconnector such that the surface treatment head is releasably attached to the end interconnector and wherein the sleeve comprises a first cross-sectional shape and at least a portion of the end interconnector comprises a second cross-sectional shape that is different from the first cross-sectional shape.

2. The modular personal care implement of claim 1, wherein a portion of an outer surface of the extension engages a portion of an inner surface of the end interconnector to form one of a mechanical connection or a magnetic connection that releasably attaches the surface treatment head to the end interconnector.

3. The modular personal care implement of claim 2, wherein the sleeve is held in position between the surface treatment head and the end interconnector by engagement between the portion of the outer surface of the extension and the portion of the inner surface of the end interconnector.

4. The modular personal care implement of claim 2, wherein the mechanical connection comprises a ball-snap connection, and wherein:
- the portion of the outer surface of the extension comprises a spring-loaded ball;
- the portion of the inner surface of the end interconnector comprises a recess; and
- the extension extends through the sleeve and is received in the end interconnector such that the spring-loaded ball engages the recess.

5. The modular personal care implement of claim 4, wherein the extension comprises a planar surface and a curved surface opposite the planar surface, the planar surface comprising a cavity that receives the spring-loaded ball and a spring.

6. The modular personal care implement of claim 2, wherein the mechanical connection comprises a threaded connection.

7. The modular personal care implement of claim 1, wherein the sleeve comprises a first material and the end interconnector comprises a second material that is different from the first material.

8. The modular personal care implement of claim 1, wherein an outer surface of the sleeve comprises a plurality of gripping protrusions and an outer surface of the end interconnector is smooth.

9. The modular personal care implement of claim 1, wherein the surface treatment head comprises a shaving razor cartridge and the applicator comprises at least one blade.

10. The modular personal care implement of claim 1, wherein the surface treatment head comprises a brush head and the applicator comprises a plurality of bristles.

11. The modular personal care implement of claim 1, wherein the surface treatment head further comprises a release mechanism positioned between the first and second end of the surface treatment head, the release mechanism comprising an actuator button configured to eject a portion of the surface treatment head comprising the applicator.

12. A method of providing a modular personal care implement, the method comprising:

providing one or more surface treatment heads each having a first end with an applicator and a second end comprising an extension;

providing a sleeve having a first cross-sectional shape;

providing an end interconnector having second cross-sectional shape that is different from the first cross-sectional shape;

releasably attaching one surface treatment head of the one or more surface treatment heads to the end interconnector such that (i) the sleeve is positioned between the one surface treatment head and the end interconnector, and (ii) the surface treatment head is releasably attached to the end interconnector.

13. The method of claim 12, wherein the one surface treatment head comprises a first applicator, the method further comprising:

removing the one surface treatment head from the end interconnector;

selecting a second surface treatment head comprising a second applicator; and releasably attaching the second surface treatment head to the end interconnector such that (i) the sleeve is positioned between the second surface treatment head and the end interconnector, and (ii) the second surface treatment head is releasably attached to the end interconnector.

14. The method of claim 12, wherein releasably attaching the one surface treatment head of the one or more surface treatment heads to the end interconnector comprises engaging a portion of an outer surface of the extension with a portion of an inner surface of the end interconnector to form one of a mechanical connection or a magnetic connection, wherein the sleeve is held in position between the one surface treatment head and the end interconnector by engagement between the portion of the outer surface of the extension and the portion of the inner surface of the end interconnector.

15. The method of claim 14, wherein the mechanical connection comprises a ball-snap connection, and wherein:

the portion of the outer surface of the extension comprises a spring-loaded ball;

the portion of the inner surface of the end interconnector comprises a recess; and the extension extends through the sleeve and is received in the end interconnector such that the spring-loaded ball engages the recess.

16. The method of claim 13, wherein the one or more surface treatment heads each further comprise a release mechanism positioned between the first and second end of the surface treatment head, the method further comprising:

actuating the release mechanism to eject a portion of the one surface treatment head comprising the applicator.

* * * * *